United States Patent [19]

Honnold, Jr. et al.

[11] 3,791,165

[45] Feb. 12, 1974

[54] CHARGING METHOD AND APPARATUS FOR A REFRIGERATION SYSTEM

[75] Inventors: Fred V. Honnold, Jr., North Syracuse; Richard L. Johnson, Baldwinsville, both of N.Y.

[73] Assignee: Carrier Corporation, Syracuse, N.Y.

[22] Filed: Nov. 18, 1971

[21] Appl. No.: 199,948

[52] U.S. Cl. .......................... 62/77, 62/149, 62/292
[51] Int. Cl. ............................................. F25b 45/00
[58] Field of Search ........................ 62/77, 292, 149

[56] References Cited
UNITED STATES PATENTS 3,303,663  2/1967  Miller .................................. 62/149
3,400,552  9/1968  Johnson ............................... 62/292

Primary Examiner—Meyer Perlin
Attorney, Agent, or Firm—D. Peter Hochberg

[57] ABSTRACT

A method and apparatus for accurately charging a refrigeration system having a fixed restriction refrigerant expansion device by adding or removing refrigerant to the system to obtain a preselected superheat temperature of the refrigerant leaving the evaporator coil as sensed by the difference in pressure of the refrigerant leaving the evaporator coil and the pressure of refrigerant in a refrigerant charged sensing bulb disposed in heat transfer relation with the refrigerant line leaving the evaporator.

7 Claims, 3 Drawing Figures

SUPERHEAT TEMPERATURE TABLE

| OUTDOOR DRY BULB,°F | INDOOR WET BULB,°F | | | | |
|---|---|---|---|---|---|
| | 56 | 62 | 68 | 70 | 72 |
| 60 | 21 | — | — | — | — |
| 65 | 19 | 26 | — | — | — |
| 70 | 16 | 24 | 35 | 40 | — |
| 75 | 14 | 21 | 32 | 38 | 44 |
| 80 | 12 | 18 | 29 | 35 | 41 |
| 85 | 10 | 16 | 26 | 32 | 38 |
| 90 | 7 | 13 | 23 | 30 | 35 |
| 95 | 5 | 10 | 20 | 26 | 32 |
| 100 | 3 | 8 | 17 | 23 | 29 |
| 105 | 1 | 6 | 14 | 19 | 26 |
| 110 | — | 4 | 10 | 16 | 23 |
| 115 | — | 2 | 7 | 12 | 19 |

INVENTOR.
FRED V. HONNOLD JR.
BY RICHARD L. JOHNSON

James E Schadt
ATTORNEY

SUCTION LINE TEMPERATURE TABLE

| OUTDOOR TEMP. °F | EVAPORATOR TEMP. °F | | | | | | | | | | | |
|---|---|---|---|---|---|---|---|---|---|---|---|---|
| | 28 | 30 | 32 | 34 | 36 | 38 | 40 | 42 | 44 | 46 | 48 | 50 |
| 60 | 60 | — | — | — | — | — | — | — | — | — | — | — |
| 65 | 49 | 58 | 65 | — | — | — | — | — | — | — | — | — |
| 70 | 41 | 48 | 58 | 68 | 70 | — | — | — | — | — | — | — |
| 75 | 35 | 41 | 48 | 58 | 68 | 75 | — | — | — | — | — | — |
| 80 | 31 | 36 | 42 | 50 | 59 | 69 | 80 | — | — | — | — | — |
| 85 | — | 32 | 38 | 44 | 52 | 60 | 71 | 82 | — | — | — | — |
| 90 | — | — | 35 | 40 | 47 | 53 | 61 | 69 | 78 | — | — | — |
| 95 | — | — | — | 37 | 42 | 48 | 53 | 59 | 67 | 79 | — | — |
| 100 | — | — | — | — | 39 | 43 | 47 | 52 | 58 | 68 | 88 | — |
| 105 | — | — | — | — | — | 40 | 44 | 48 | 53 | 60 | 75 | 104 |
| 110 | — | — | — | — | — | — | 41 | 44 | 49 | 54 | 65 | 80 |
| 115 | — | — | — | — | — | — | — | — | 46 | 50 | 62 | 69 |

FIG. 3

CHARGING METHOD AND APPARATUS FOR A REFRIGERATION SYSTEM

BACKGROUND OF THE INVENTION

The use of fixed restrictions to control refrigerant flow between the high pressure side of a refrigeration system and the low pressure side of the system has become increasingly popular due to the low initial cost thereof. Further, the absence of moving parts in fixed restrictions eliminates problems of wear or malfunctions encountered in restriction devices having movable parts.

However, the use of fixed restriction devices in a refrigeration system necessitates a very accurate refrigerant charge in the system for proper system operation. This does not create a problem in products such as window air conditioners, refrigerators, water coolers, etc., having a self-contained factory charged system, as fairly complex commercial equipment may be advantageously and economically employed in the factory charging procedure. One method which may be used in the factory to charge systems is to evacuate the unit and then supply liquid refrigerant to the unit through an extremely accurate flow meter.

In systems where the refrigerant evaporator is located remote from the condensing unit, the system must be charged in the field unless precharged system components having suitable connections thereon to prevent loss of charge when the system is assembled are used.

However, even with the products mentioned above, if the system malfunctions and repairs which result in loss of refrigerant from the system are necessary, a problem is encountered in recharging the system with the proper quantity of refrigerant.

The method commonly employed under these circumstances is to evacuate the entire system and charge the system with the required quantity of refrigerant by weight. To accomplish this, the refrigerant supply tank is placed on an accurate scale and refrigerant is admitted into the system until the refrigerant supply tank is lighter by the amount of refrigerant required in the system. This is a difficult procedure in the field since the charge ordinarily must be correct to a fraction of an ounce of refrigerant for optimum system performance. Equipment having an accurate flow meter of the type used for factory charging is ordinarily not used for field charging due to the prohibitive cost of the equipment.

BRIEF DESCRIPTION OF THE DRAWING

FIG. 3 is a table for use with the charging apparatus of FIG. 1 having a different format than the table of FIG. 2.

DESCRIPTION OF THE PREFERRED EMBODIMENT

Figures 1, 2:
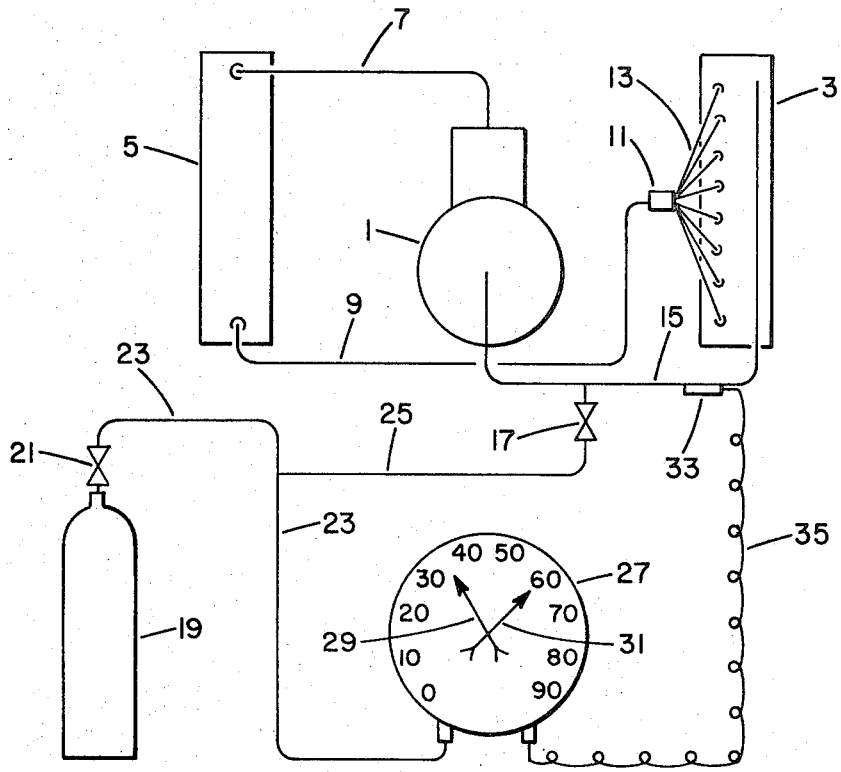
FIG. 1 is a schematic illustration of a refrigeration system having the charging apparatus of the present invention connected thereto.
FIG. 2 is a table for use with the charging apparatus of FIG. 1 setting forth the required superheat values at various condensing and evaporating temperatures.

Referring to FIG. 1, there is illustrated a refrigeration system including a compressor 1, an evaporator 3 and a condenser 5. Hot gaseous refrigerant from the compressor 1 is provided to condenser 5 through line 7. The hot gaseous refrigerant is cooled and condensed in condenser 5, the cooled liquid refrigerant being supplied from condenser 5 through line 9, through a suitable refrigerant distributor 11 and a plurality of capillary tubes 13 to the evaporator 3. The refrigerant which is vaporized in evaporator 3 by heat transfer relation with a medium to be cooled is returned to the compressor inlet through refrigerant line 15 to complete the refrigeration cycle. A valve 17 is provided for adding or removing refrigerant from the refrigeration system to provide the optimum refrigerant charge therein as will be hereinafter explained.

Upon initial installation of the refrigeration system or after repairs to the system which necessitate removal of refrigerant therefrom, the system must be properly charged. To accomplish this, an approximate quantity of refrigerant may be added to the system through valve 17 from a bottle of refrigerant 19. A valve 21 is provided on refrigerant bottle 19 to control flow of refrigerant from bottle 19 through suitable refrigerant lines 23 and 25 to valve 17. After the initial charge of refrigerant is added, the refrigeration system may be energized and allowed to run until equilibrium conditions are obtained. To provide an optimum refrigerant charge, a dual pressure gauge 27 is provided having a first pointer 29 adapted to indicate the saturated temperature corresponding to the pressure in line 23 and a second pointer 31 adapted to indicate the saturated temperature corresponding to the refrigerant pressure in a bulb 33 which is charged with an equilibrium mixture of refrigerant vapor and refrigerant liquid. After the initial refrigerant charge is supplied to the refrigeration system, the valve 21 is closed and the valve 17 is maintained open to provide communication between the refrigeration system and gauge 27. The refrigerant filled bulb 33 is strapped on the refrigerant line leaving evaporator 3 to sense the actual temperature of the leaving refrigerant as a function of refrigerant pressure in bulb 33, which is communicated to gauge 27 through tube 35.

It can be seen from the foregoing that dial 29 will indicate the saturated temperature corresponding to the actual refrigerant pressure in line 15, while dial 31 will indicate the saturated temperature corresponding to the refrigerant pressure of the refrigerant in line 35 (thus dial 31 indicates the actual refrigerant temperature in line 15). The temperature differential between the temperature indicated by pointer 29 and the temperature indicated by pointer 31 is therefore the amount of superheat in the refrigerant leaving evaporator 3.

The table illustrated in FIG. 2 indicates the required superheat for various combinations of outdoor dry bulb temperature and indoor wet bulb temperature. By reference to the chart, the service man may determine the number of degrees of refrigerant superheat which are obtained at various condensing and evaporating temperatures when the system has an optimum refrigerant charge therein. To obtain the optimum charge, the service man simply must add refrigerant to the system to decrease the superheat to the desired value, or bleed refrigerant from the system to increase the superheat to the desired value.

The table of FIG. 3 may be utilized in place of the table of FIG. 2 for charging a refrigeration system when it may be inconvenient to obtain indoor wet bulb temperatures. Since there is a correlation between indoor wet bulb temperature and saturated suction temperature within the evaporator, the simplified table of FIG. 3 may be utilized in place of the table of FIG. 2. The evaporator temperature designation on the table refers to the saturated refrigerant temperature of the evaporator or in other words, the saturated temperature of the refrigerant which corresponds to the refrigerant pressure obtained at valve 17 to provide the temperature indicated at pointer 29. The actual temperature of refrigerant leaving the evaporator is measured by the bulb 33 which produces a pressure in line 35 which would be the saturated suction pressure at the temperature indicated by pointer 31. Thus, the difference between the temperature valves registered by pointer 29 and pointer 31 is the actual superheat. By reference to the table of FIG. 3, the service man may provide the optimum charge by adding or removing refrigerant from the system to obtain the suction line temperature in the table corresponding to the saturated evaporator temperature indicated by pointer 29 in relation to outdoor temperature without the necessity for obtaining indoor wet bulb temperature or determining the temperature differential indicated by pointers 29 and 31 which is required for use of the table of FIG. 2.

The disclosed system and the superheat tables of FIG. 2 or FIG. 3 may be utilized for charging any refrigerant system having a fixed refrigerant expansion device which utilizes refrigerant 22 (monochlorodifluoromethane) as a refrigerant. This is true irrespective of the size of the system or the relative sizes of the condenser, evaporator, and compressor. While it has heretofore been recognized that variations in the refrigerant charge of an individual refrigeration system would affect the refrigerant superheat, the direct correlation between optimum charge and superheat for all refrigeration systems utilizing a given refrigerant and a fixed restriction expansion device has not been recognized.

It should be understood that gauge 27 is basically a pressure gauge which registers refrigerant pressure in suction line 15 and the refrigerant pressure in bulb 33. The refrigerant in bulb 33 is preferably the same refrigerant as the refrigerant utilized in the refrigeration system. Since at any given pressure there is a corresponding saturated temperature, the face of the pressure gauge may be designed to indicate the temperatures which would correspond to the saturated temperatures of the refrigerant at the refrigerant pressures transmitted to the gauge.

While we have described a pressure gauge adapted for indicating two separate pressures, it is to be understood that two separate pressure gauges or a differential pressure gauge employing a single pointer to directly measure the temperature differential may be utilized. Further, while the chart of FIG. 2 provides the required superheat readings for optimum charge at various condensing and evaporating temperatures for refrigerant 22 (monochlorodifluoromethane) it should be understood that a similar chart could be developed for other refrigerants such as refrigerant 12 (dichlorodifluoromethane).

While we have described a preferred embodiment of our invention, it should be understood that the invention is not limited thereto, but may be otherwise embodied within the scope of the following claims.

We claim:

1. A method of charging a refrigeration system including a condenser for transferring heat to a heat exchange medium passing in heat exchange relationship with refrigerant in the condenser, an evaporator, a fixed restriction for regulating the flow of refrigerant from the condenser to the evaporator, and a suction line for transferring refrigerant leaving the evaporator, according to a predetermined value of superheat of refrigerant leaving the evaporator, said predetermined value being a function of the temperature of said heat exchange medium, said method comprising the steps of:

measuring the actual temperature of refrigerant leaving the evaporator;

measuring the pressure of refrigerant leaving the evaporator to determine the saturated refrigerant temperature corresponding to said pressure;

measuring the temperature of the heat exchange medium ambient to the condenser and passing in heat exchange relationship with refrigerant in the condenser; and varying the quantity of refrigerant in the refrigeration system to obtain a measured value of superheat of refrigerant leaving the evaporator, which measured value is equal to said predetermined value of superheat at the temperature of the heat exchange medium passing in heat exchange relationship with refrigerant in the condenser.

2. A method of charging a refrigeration system adapted to condition an indoor space, said system including a condenser for transferring heat to a heat exchange medium passing in heat exchange relationship with refrigerant in the condenser, an evaporator, a fixed restriction for regulating the flow of refrigerant from the condenser to the evaporator, and a suction line for transferring refrigerant leaving the evaporator, according to a predetermined differential between the actual temperature of refrigerant leaving the evaporator and the saturated refrigerant temperature corresponding to the pressure of refrigerant leaving the evaporator, said predetermined differential being a function of the temperature of said heat exchange medium and of the indoor wet bulb temperature, said method comprising the steps of:

measuring the actual temperature of refrigerant leaving the evaporator;

measuring the pressure of refrigerant leaving the evaporator to determine the saturated refrigerant temperature corresponding to said pressure;

measuring the temperature of the heat exchange medium ambient to the condenser passing in heat exchange relationship with refrigerant in the condenser;

measuring the indoor wet bulb temperature; and varying the quantity of refrigerant in the system to obtain a measured differential between the actual temperature of refrigerant leaving the evaporator and the saturated refrigerant temperature corresponding to the pressure of refrigerant leaving the evaporator, which measured differential is equal to the value of said predetermined differential at the measured temperature of the heat exchange medium passing in heat exchange relationship with refrigerant in the condenser at the indoor wet bulb temperature.

3. The invention according to claim 2 wherein said predetermined differential is determined according to the following table:

PREDETERMINED DIFFERENTIAL BETWEEN THE ACTUAL TEMPERATURE OF REFRIGERANT LEAVING THE EVAPORATOR AND THE SATURATED REFRIGERANT TEMPERATURE CORRESPONDING TO THE PRESSURE OF REFRIGERANT LEAVING THE EVAPORATOR

| Measured temperature of external heat exchange medium, °F | Measured indoor wet bulb, °F | | | | |
|---|---|---|---|---|---|
| | 56 | 62 | 68 | 70 | 72 |
| 60 | 21 | — | — | — | — |
| 65 | 19 | 26 | — | — | — |
| 70 | 16 | 24 | 35 | 40 | — |
| 75 | 14 | 21 | 32 | 38 | 44 |
| 80 | 12 | 18 | 29 | 35 | 41 |
| 85 | 10 | 16 | 26 | 32 | 38 |
| 90 | 7 | 13 | 23 | 30 | 35 |
| 95 | 5 | 10 | 20 | 26 | 32 |
| 100 | 3 | 8 | 17 | 23 | 29 |
| 105 | 1 | 6 | 14 | 19 | 26 |
| 110 | — | 4 | 10 | 16 | 23 |
| 115 | — | 2 | 7 | 12 | 19 | and wherein the step of varying the quantity of refrigerant in the system to obtain said measured differential comprises locating in the table the predetermined differential corresponding to (1) the measured temperature of the heat exchange medium at the condenser and (2) the measured indoor wet bulb temperature, and varying the quantity of refrigerant in the system until the measured differential equals the predetermined differential located in the table.

4. A method of charging a refrigeration system including a condenser for transferring heat to an external heat exchange medium passing in heat exchange relationship with refrigerant in the condenser, an evaporator, a fixed restriction for regulating the flow of refrigerant from the condenser to the evaporator, and a suction line for transferring refrigerant leaving the evaporator, according to a predetermined suction line temperature, said predetermined suction line temperature being a function of (1) the temperature of said external heat exchange medium and (2) of the saturated refrigerant temperature corresponding to the pressure of refrigerant leaving the evaporator, said method comprising the steps of:

measuring the actual suction line temperature;
measuring the pressure of refrigerant leaving the evaporator and determining the saturated refrigerant temperature corresponding to said pressure;
measuring the temperature of the external heat exchange medium passing in heat exchange relationship with refrigerant in the condenser; and
varying the quantity of refrigerant in the refrigeration system to obtain a measured suction line temperature equal to the value of said predetermined suction line temperature at (1) the temperature of the external heat exchange medium passing in heat exchange relationship with refrigerant in the condenser and at (2) the saturated refrigerant temperature corresponding to the pressure of refrigerant leaving the evaporator.

5. The invention according to claim 4 wherein said predetermined suction line temperature is determined according to the following table:

PREDETERMINED SUCTION LINE TEMPERATURE TABLE

| Measured temperature of external heat exchange medium, °F. | Measured saturated refrigerant temperature corresponding to the pressure of refrigerant leaving the evaporator | | | | | | | | | | |
|---|---|---|---|---|---|---|---|---|---|---|---|
| | 28 | 30 | 32 | 34 | 36 | 38 | 40 | 42 | 44 | 46 | 48 | 50 |
| 60 | 60 | | | | | | | | | | | |
| 65 | 49 | 58 | 65 | | | | | | | | | |
| 70 | 41 | 48 | 58 | 68 | 70 | | | | | | | |
| 75 | 35 | 41 | 48 | 58 | 68 | 75 | | | | | | |
| 80 | 31 | 36 | 42 | 50 | 59 | 69 | 80 | | | | | |
| 85 | | 32 | 38 | 44 | 52 | 60 | 71 | 82 | | | | |
| 90 | | | 35 | 40 | 47 | 53 | 61 | 69 | 78 | | | |
| 95 | | | | 37 | 42 | 48 | 53 | 59 | 67 | 79 | | |
| 100 | | | | | 39 | 43 | 47 | 52 | 58 | 68 | 88 | |
| 105 | | | | | | 40 | 44 | 48 | 53 | 60 | 75 | 104 |
| 110 | | | | | | | 41 | 44 | 49 | 54 | 65 | 80 |
| 115 | | | | | | | | | 46 | 50 | 62 | 69 | and wherein the step of varying the quantity of refrigerant in the refrigeration system to obtain said measured suction line temperature comprises locating in the table the predetermined suction line temperature at (1) the measured temperature of the external heat exchange medium and (2) the measured saturated refrigerant pressure corresponding to the pressure of refrigerant leaving the evaporator, and varying the quantity of refrigerant in the system until the measured suction line temperature equals the predetermined suction line temperature located in the table.

6. Apparatus for charging a refrigeration system having (a) an evaporator and (b) a condenser for transferring heat to an external heat exchange medium, with refrigerant from supply means having an adjustable valve for regulating the flow of refrigerant into and from the system, according to a predetermined differential between (1) the actual temperature of refrigerant leaving the evaporator and (2) the saturated refrigerant temperature corresponding to the pressure of refrigerant leaving the evaporator, said apparatus comprising:

temperature responsive means for sensing the actual temperature of refrigerant leaving the evaporator;
pressure responsive means for sensing the pressure of refrigerant leaving the evaporator;
indicating means operatively connected to said temperature responsive means and to said pressure responsive means for indicating the differential between (1) the actual temperature of refrigerant leaving the evaporator and (2) the saturated refrigerant temperature corresponding to the pressure sensed by said pressure responsive means; and
a chart giving substantially the following values of said differential:

PREDETERMINED DIFFERENTIAL BETWEEN THE ACTUAL TEMPERATURE OF REFRIGERANT LEAVING THE EVAPORATOR AND THE SATURATED REFRIGERANT TEMPERATURE CORRESPONDING TO THE PRESSURE OF REFRIGERANT LEAVING THE EVAPORATOR

| Temperature of external heat exchange medium, °F | indoor wet bulb, °F | | | | |
|---|---|---|---|---|---|
| | 56 | 62 | 68 | 70 | 72 |
| 60 | 21 | — | — | — | — |
| 65 | 19 | 26 | — | — | — |
| 70 | 16 | 24 | 35 | 40 | — |
| 75 | 14 | 21 | 32 | 38 | 44 |
| 80 | 12 | 18 | 29 | 35 | 41 |
| 85 | 10 | 16 | 26 | 32 | 38 |
| 90 | 7 | 13 | 23 | 30 | 35 |

| 95  | 5 | 10 | 20 | 26 | 32 |
| 100 | 3 | 8  | 17 | 23 | 29 |
| 105 | 1 | 6  | 14 | 19 | 26 |
| 110 | — | 4  | 10 | 16 | 23 |
| 115 | — | 2  | 7  | 12 | 19 | whereby the flow of refrigerant into and from the system can be regulated until the value of the differential indicated by said indicating means equals the predetermined differential from said chart at the temperature of the external heat exchange medium and at the indoor wet bulb temperature.

7. Apparatus for charging a refrigeration system having (a) an evaporator (b) a suction line from the evaporator, and (c) a condenser for transferring heat to an external heat exchange medium, with refrigerant from supply means having an adjustable valve for regulating the flow of refrigerant into and from the system, according to a predetermined suction line temperature, said apparatus comprising:

temperature responsive means for sensing the actual suction line temperature;
   pressure responsive means for sensing the pressure of refrigerant leaving the evaporator;
   indicating means operatively connected to said temperature responsive means and to said pressure responsive means for indicating (1) the actual suction line temperature and (2) the saturated refrigerant temperature corresponding to the pressure sensed by said pressure responsive means; and
   a chart giving substantially the following values of said predetermined suction line temperature:

PREDETERMINED SUCTION LINE TEMPERATURE TABLE

| Temperature of external heat exchange medium, °F. | Saturated refrigerant temperature corresponding to the pressure of refrigerant leaving the evaporator | | | | | | | | | | | |
| --- | --- | --- | --- | --- | --- | --- | --- | --- | --- | --- | --- |
|  | 28 | 30 | 32 | 34 | 36 | 38 | 40 | 42 | 44 | 46 | 48 | 50 |
| 60  | 60 |    |    |    |    |    |    |    |    |    |    |    |
| 65  | 49 | 58 | 65 |    |    |    |    |    |    |    |    |    |
| 70  | 41 | 48 | 58 | 68 | 70 |    |    |    |    |    |    |    |
| 75  | 35 | 41 | 48 | 58 | 68 | 75 |    |    |    |    |    |    |
| 80  | 31 | 36 | 42 | 50 | 59 | 69 | 80 |    |    |    |    |    |
| 85  |    | 32 | 38 | 44 | 52 | 60 | 71 | 82 |    |    |    |    |
| 90  |    |    | 35 | 40 | 47 | 53 | 61 | 69 | 78 |    |    |    |
| 95  |    |    |    | 37 | 42 | 48 | 53 | 59 | 67 | 79 |    |    |
| 100 |    |    |    |    | 39 | 43 | 47 | 52 | 58 | 68 | 88 |    |
| 105 |    |    |    |    |    | 40 | 44 | 48 | 53 | 60 | 75 | 104 |
| 110 |    |    |    |    |    |    | 41 | 44 | 49 | 54 | 65 | 80 |
| 115 |    |    |    |    |    |    |    |    | 46 | 50 | 62 | 69 | whereby the flow of refrigerant into and from the system can be regulated until the value of the actual suction line temperature indicated by said indicating means equals the predetermined suction line temperature at the temperature of the external heat exchange medium and at the saturated refrigerant temperature corresponding to the pressure of refrigerant leaving the evaporator.

* * * * *